July 7, 1970    L. E. BROBERG    3,519,152
ROTARY CUTTER MEANS HAVING POSITIVE INDEXING DRIVE
Filed Oct. 10, 1968
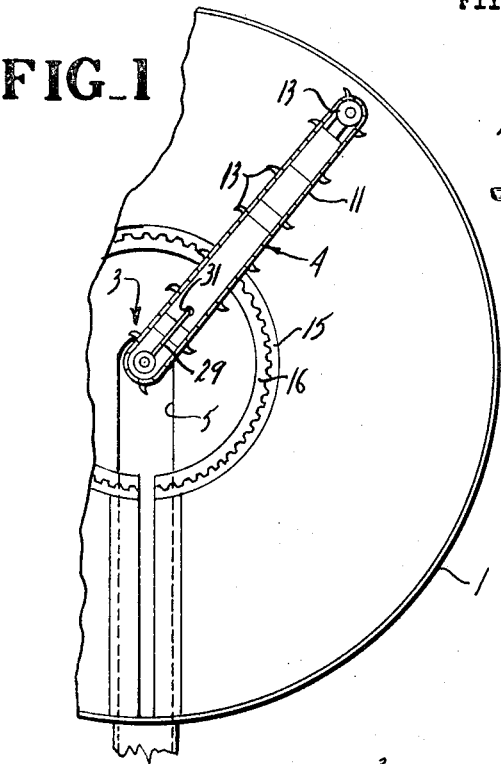
FIG_1
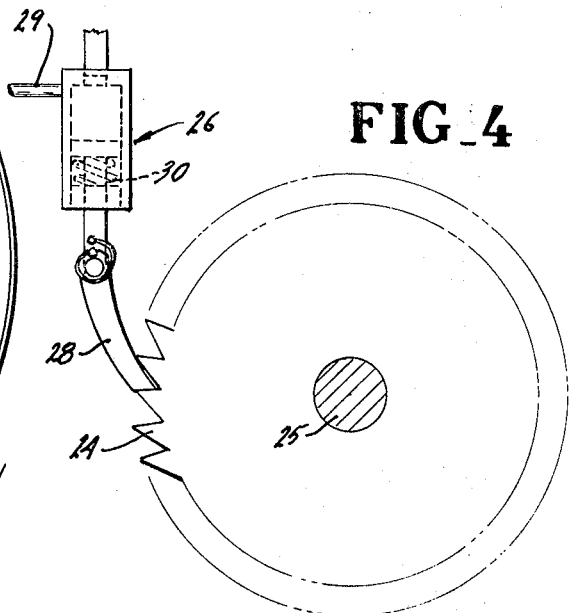
FIG_4
FIG_2
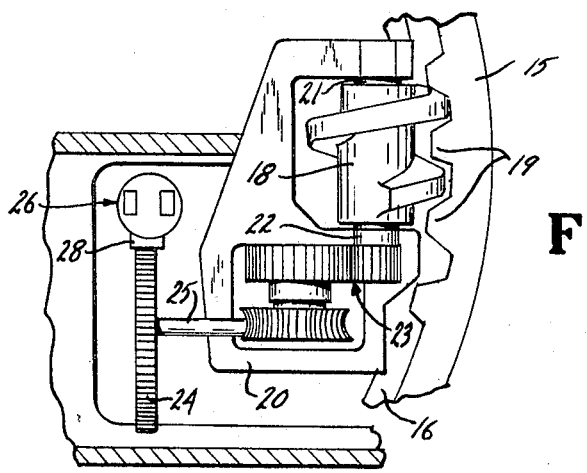
FIG_3
INVENTOR.
LEONARD E. BROBERG
BY
Attorneys

United States Patent Office 3,519,152
Patented July 7, 1970

3,519,152
ROTARY CUTTER MEANS HAVING POSITIVE INDEXING DRIVE
Leonard E. Broberg, Milwaukee, Wis., assignor to A. O. Smith Harvestore Products, Inc., Arlington Heights, Ill., a corporation of Delaware
Filed Oct. 10, 1968, Ser. No. 766,589
Int. Cl. B65g 65/42
U.S. Cl. 214—17                               5 Claims

ABSTRACT OF THE DISCLOSURE

This disclosure relates to a positive indexing drive system for a rotary cutter arm mounted to undercut silage in a silo.

A bottom unloader is mounted in the base of the storage structure and includes a cutter arm which is centrally pivoted and driven at the center of the silo. A recess in the base surrounds the center pivot structure. A driven worm is secured to the underside of the cutter arm in mesh with a rack secured within the recess to index the arm about the center of the silo.

A hydraulic piston unit and ratchet drive are secured within the arm and coupled to rotate the worm to provide controlled indexing motion.

---

The present invention is particularly directed to a positive drive mechanism of a self cleaning variety which can be readily incorporated as a part of a bottom unloader and which is properly enclosed and protected from the silage or stored material. Generally, in accordance with the present invention, the cutter arm is centrally mounted and extends outwardly over the main floor or base which is provided with a central depression defining a recess immediately below the floor of the structure. An annular gear member is secured to the vertical periphery or surface of the stepped portion; with the top of the gear ring disposed preferably below the main floor area such that the cutter arm can continuously sweep the floor without interference. A worm is rotatably secured to the arm and located within the recess portion in engagement with the teeth of the gear ring. The worm and associated mechanism is preferably mounted beneath the cutter arm to protect the mechanism. The worm is rotated, preferably through a hydraulic drive system, and through interaction with the fixed gear ring, rotates the cutter arm across the bottom of the storage structure. A highly satisfactory system for driving of the worm includes a hydraulic cylinder acting through a ratchet and gear train. The worm and gear ring in combination with the hydraulically driven ratchet drive maintains firm and positive engagement of the cutter with the stored material at all times.

The system permits the use of a relatively small diameter gear ring.

The drawing furnished herewith illustrates the best mode presently contemplated by the inventor for carrying out the invention and clearly discloses the above advantages and features as well as others which will be readily understood from the following description of the drawing.

In the drawing:

FIG. 1 is a horizontal section taken through a silo type structure incorporating a bottom unloader constructed in accordance with the teaching of the present invention;

FIG. 2 is a fragmentary vertical section taken generally on line 2—2 of FIG. 1,

FIG. 3 is an enlarged fragmentary view of FIG. 1 more clearly illustrating the indexing drive mechanism shown in FIG. 1; and FIG. 4 is an enlarged vertical section taken generally on line 4—4 of FIG. 2.

Referring to the drawing and particularly to FIG. 1, the present invention is shown incorporated in a cylindrical storage structure such as a silo 1 which is adapted to contain silage or the like. The silo is disposed on a suitable concrete foundation 2 and projects vertically upwardly therefrom. A bottom unloader 3 is mounted within the silo 1 and includes a cutter arm 4 having one end interconnected to a drive mechanism at the center of the silo and extended radially outwardly therefrom. The cutter arm 4 is adapted to sweep over the floor of the silo 1 and the foundation 2 to continuously undercut the silage in the storage structure or silo 1 and move it to the center of the silo 1 and in particular into the inner end of a radially extending trough 5 formed in the foundation 2. A suitable conveying member or unit, not shown, is mounted within the trough 5 and serves to convey the silage to the exterior of the silo structure.

Generally, the cutter arm 4 is similar to that disclosed in the previously referred to U.S. Pat. 2,755,942 and includes a generally rectangular hollow body 6 having a mounting insert 7 attached to the inner end thereof in any suitable manner. The mounting insert 7 is rotatably mounted on a vertical shaft 8 of a vertical center post assembly which is secured within a central well portion of trough 5 at the center of the silo 1. A rotatable hub 9 which carries a driven sprocket 10 attached thereto is secured to the central portion of the shaft 8 and interconnected in any suitable manner to a drive means, not shown, to establish rotary motion of the sprocket. An endless cutter chain 11 meshes with sprocket 10 and encircles the rectangular body 6 of the cutter with the outer end similarly supported by a suitable sprocket 12 secured to the opposite end of the cutter body. The rotation of the sprocket 10 causes the cutter chain 11 to move continuously about the cutter. A plurality of cutter teeth 13 are secured to the endless cutter chain 11 and serve to continuously dig into the adjacent silage, thereby undercutting and moving the silage into the inner end of the trough.

The present invention is particularly directed to a positive drive system to maintain indexing of a cutter about the floor of the silo 1 and to thereby maintain the cutting means digging into the silage.

The illustrated drive system utilized to index or rotate the cutter arm 4 about the shaft 8 includes a centrally depressed portion or recess 14 in the foundation 2 surrounding the center post assembly opening or well. A gear ring 15 is secured adjacent the outer peripheral wall of the recess, with the upper surface of the gear ring 15 generally in the plane of the floor of the silo 1 and below the plane circumscribed by the cutter arm 4. The depth of the recess 14 generally corresponds to the depth of the gear ring unit which is provided with a mounting flange 16 resting on the floor of the recess 14. The gear ring 15 is fixedly secured to the floor by a plurality of circumferentially distributed bolts 17 to prevent rotation of the gear ring. A driven worm 18 is rotatably supported on the underside of the cutter arm 4 and meshes with inwardly projecting teeth 19 on the upper side of the gear ring. The forced rotation of the worm 18 on the gear ring 15 causes an indexing force to be created directly on the cutter arm which rotates to maintain a firm cutting engagement of the cutter teeth 13 into the silage for the continuous undercutting of the same.

As most clearly shown in FIGS. 2-4, a gear housing 20 is bolted or otherwise secured to the lower plate of the cutter arm body 6. The worm 18 is rotatably mounted by a shaft 21 journaled in suitable bearing members 22 of such housing which is located to dispose the worm 18 in continuous mesh with the teeth of the gear ring 15. The one end of the worm shaft 21 extends into a gear chamber and is connected to a gear train 23. The input to the gear train 23 is a ratchet wheel 24 which is supported by suitable shaft 25. An hydraulic cylinder assembly 26 is secured within the body 6 of the cutter arm 4 and includes a reciprocating shaft 27 terminating in a suitable ratchet pawl 28 which is spring biased into engagement with the ratchet wheel 24. The hydraulic cylinder unit 26 is provided with a hydraulic power input line 29 and an automatic return spring 30. As a result, pulsating application of liquid to the input line 29 results in a reciprocation of the shaft 27 and rotation of the ratchet wheel 24. The gear train 23 transmits the stepped movement to the worm 18. As a result of the interaction between worm 18 and the teeth 19 of the fixed gear ring 15, the indexing force is applied to the housing 20 and interconnected cutter arm 4. This force forces the cutter arm into firm engagement with the silage.

The power line 29 is connected to the hydraulic cylinder unit 26 within the body 6 and extends upwardly through a small opening 31 in the cutter arm and over the mounting insert 7 to the central portion of the center post assembly. The line is connected to a suitable pressurized liquid source, not shown. A connecting line may extend downwardly through the center post assembly and outwardly through the trough 5 to provide a controlled application of liquid to the hydraulic cylinder unit 26.

In the operation of the illustrated embodiment of the unloader 3, the power is transmitted to the center post assembly to cause a continuous rotation of the endless cutter chain 11 for undercutting of the silage and moving it centrally into the trough 5. Hydraulic power is periodically applied to the hydraulic cylinder unit 26 to cause ratcheted movement of the ratchet wheel 24 which in turn causes a stepped rotation of the worm 18. The interaction between the worm 18 and the teeth 19 of the fixed gear ring 15 results in the lateral or horizontal thrust forces on the housing 20 and attached cutter arm 4 to cause it to move about the center of the silo and maintain the cutter teeth 13 in engagement with the silage.

The worm action with respect to the gear ring provides a self-cleaning action to continuously remove any silage which may be lodged in the teeth.

The cutter arm body 6 provides a protective cover or enclosure for the hydraulic cylinder unit and the indexing drive mechanism.

The present invention thus provides a drive system for rotating of a sweep arm cutter forming a part of a bottom unloader which will permit positive indexing of the arm without creating undue stress on the pivot mechanism. The system is essentially enclosed and generally minimizes the maintenance cost while providing relatively long and satisfactory life.

I claim:

1. A cutter assembly forming a part of a bottom unloader and including a cutter arm pivotally mounted at one end for removing stored material from a storage structure by undercutting of such stored material at the center of the storage structure which comprises a circular gear member mounted within the floor of said structure and spaced radially outwardly of the center of the structure, said member having its upper plane disposed beneath the plane circumscribed by the rotating cutter arm and exposed thereto, a drive worm secured to the underside of the cutter arm and disposed in mating engagement with the teeth of the gear member, and drive means coupled to rotate the worm and to thereby cause said worm to advance on the gear member and correspondingly position the cutter arm to move the cutter arm about the central axis of the storage structure.

2. The cutter assembly of claim 1 having a foundation defining the floor of said structure, said foundation having a discharge trough extending radially outwardly from the center of the structure, a peripheral open recess in the foundation at the center of the trough defining a central mounting surface disposed beneath the plane of the floor, and means to secure the gear member to the central mounting surface.

3. The cutter assembly of claim 1 wherein said drive means includes a gear train unit connected to said arm and terminating in the worm to cause rotation of the worm, and a hydraulic unit secured to the arm and coupled to drive said gear train to move the arm about the central axis of the storage structure.

4. The cutter assembly of claim 2 wherein a center post assembly secured within the inner end of the trough, said cutter arm includes a generally hollow body member and a mounting insert rotatably mounted to the center post assembly, a cutter chain rotatably mounted to rotate about the periphery of the insert and body member, means rotatably mounting the drive worm to the bottom wall of the cutter body, and said drive means including a hydraulic motor means disposed within said body and coupled to the worm to cause rotation of the worm.

5. The cutter assembly of claim 4 wherein said hydraulic motor means includes a piston-cylinder unit secured within said body and having a piston rod, a gear housing secured within the bottom wall of said body and housing a gear train, an outer ratchet wheel aligned with said rod and connected to the gear train, a ratchet pawl secured to the end of the rod and coupled to the ratchet wheel, means rotatably mounting the worm on said gear housing and connected to said gear train for rotation in accordance with the reciprocation of said rod.

References Cited

UNITED STATES PATENTS

| | | | |
|---|---|---|---|
| 3,229,665 | 1/1966 | Baltz | 214—17 XR |
| 3,237,788 | 3/1966 | Weaver et al. | 214—17 |

OTHER REFERENCES

German Printed Application (Pfenning), 1,207,287, December 1965.

ROBERT G. SHERIDAN, Primary Examiner

U.S. Cl. X.R.

198—124